United States Patent [19]

Kojima et al.

[11] 4,383,241
[45] May 10, 1983

[54] VOICE WARNING SYSTEM FOR VEHICLES

[75] Inventors: Akira Kojima, Toki; Atutoshi Okamoto, Aichi, both of Japan

[73] Assignee: Nippondenso Co., Ltd., Kariya, Japan

[21] Appl. No.: 314,414

[22] Filed: Oct. 23, 1981

[30] Foreign Application Priority Data

Oct. 24, 1980 [JP] Japan ................................ 55-149812

[51] Int. Cl.³ .............................................. G08B 19/00
[52] U.S. Cl. ................................ 340/52 F; 179/1 SM;
340/519; 340/521; 340/692
[58] Field of Search ................ 340/21 R, 27 R, 52 R,
340/52 D, 52 F, 517, 518, 519, 520, 521, 523,
692; 179/1 SM, 1 SA

[56] References Cited

U.S. PATENT DOCUMENTS

| | | | |
|---|---|---|---|
| 3,538,264 | 11/1970 | Van Dyke | 340/692 X |
| 3,581,014 | 5/1971 | Vogel et al. | 340/692 X |
| 3,582,949 | 6/1971 | Forst | 340/692 X |
| 3,870,818 | 3/1975 | Barton et al. | 340/692 X |
| 3,879,704 | 4/1975 | Naji | 340/52 F |
| 4,310,825 | 1/1982 | Tsunoda | 340/52 F |
| 4,314,232 | 2/1982 | Tsunoda | 340/52 F |

*Primary Examiner*—John W. Caldwell, Sr.
*Assistant Examiner*—Joseph E. Nowicki
*Attorney, Agent, or Firm*—Cushman, Darby & Cushman

[57] ABSTRACT

A voice warning system for vehicles adapted to give a voice warning of a specified condition detected by one of a plurality of sensors in one of a plurality of items of a vehicle which are to be checked, includes a rank selector switch which classifies the items to be checked into a plurality of ranks of different priorities whereby when a given one of the ranks is selected, the generation of a voice warning is inhibited even if a specified condition is detected in any one of the items belonging to the rank or ranks lower in priority than the selected rank.

4 Claims, 4 Drawing Figures

VOICE WARNING SYSTEM FOR VEHICLES

BACKGROUND OF THE INVENTION

The present invention relates to a voice warning system for vehicles which is so designed that when a specified or critical condition is detected in any one of a plurality of items of a vehicle which are to be detected, the detected specified condition is warned by a predetermined voice.

A voice warning system for vehicles is known in the art in which when the occurrence of a specified condition is detected in at least one of a plurality of items of a vehicle which are to be detected, a warning of the specified or critical condition is given in the form of a predetermined voice or spoken words.

However, this type of known system is disadvantageous in that the plurality of items to be detected include those items which are high in importance and others which are low in importance and the driver will feel annoyed with the warning by voice of a specified condition in any of those items which are low in importance.

SUMMARY OF THE INVENTION

With a view to overcoming the foregoing deficiency in the prior art, it is the object of the present invention to provide an improved voice warning system for vehicles in which when the voice warning is inhibited by an external operation with respect to any of a plurality of items to be detected, even if the associated sensor detects the occurrence of a specified or critical condition in the inhibited item, the voice warning of the specified condition is prevented, thus selectively inhibiting the voice warning with respect to the items in accordance with the desire of the vehicle occupants.

DESCRIPTION OF THE PREFERRED EMBODIMENT

Figure 1:
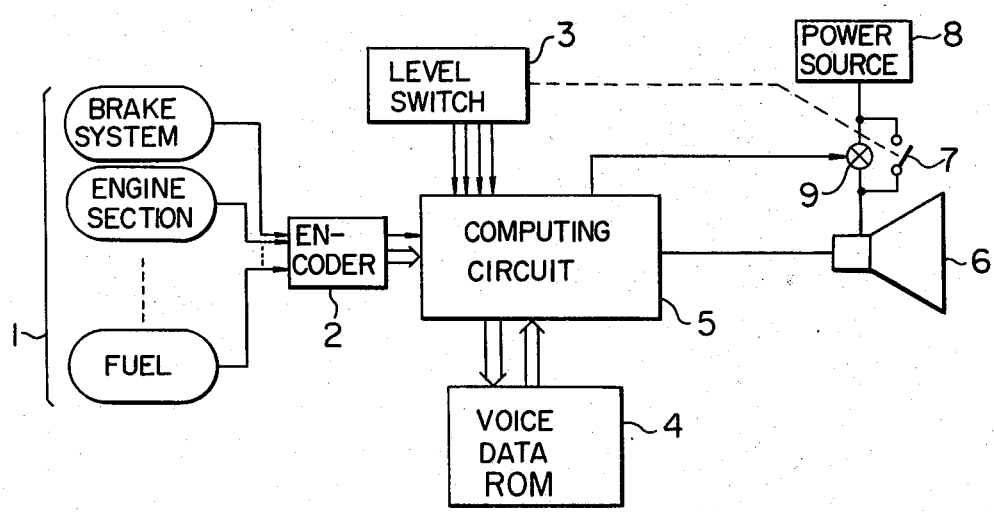
FIG. 1 is a block diagram showing the overall construction of an embodiment of the present invention.

The present invention will now be described in greater detail with reference to the illustrated embodiment. FIG. 1 is a block diagram showing the overall construction of the embodiment of the invention. In the Figure, numeral 1 designates a group of sensors for respectively monitoring the condition of the brake system, the engine section, . . . , the fuel level, etc., so that when a specified or critical condition (a malfunction or abnormal condition) is detected, a signal indicative of the specified condition is generated. Numeral 2 designates an encoder whereby when a specified condition detection signal is generated from the sensor group 1, a code signal indicative of the item causing the specified condition detection signal and an interruption signal are generated. Numeral 3 designates a level switch forming command means for generating a command signal to inhibit the voice warning with respect to selected ones of the items even if a specified condition is detected in any one of the selected items.

Numeral 4 designates a voice data ROM having preliminarily stored therein the necessary voice data such that the predetermined corresponding voice is generated when a specified condition is detected by the sensor group 1. Numeral 5 designates a computing circuit including a microcomputer and forming control means responsive to the code signal and the interruption signal from the encoder 2 and the command signal from the level switch 3 whereby whether a voice warning is to be given is determined and when the decision is affirmative the corresponding voice data is read from the ROM 4 to generate a voice signal. The computing circuit 5 performs the required control computational operations for sensors and control circuits which are not shown in addition to the computational operations for the previously mentioned voice warning purposes.

Numeral 6 designates a speaker, 7 a power supply switch for operating the speaker 6, 8 a power source, and 9 a switch responsive to the signal from the computing circuit 5 to forcibly operate the speaker 6.

Figure 2:
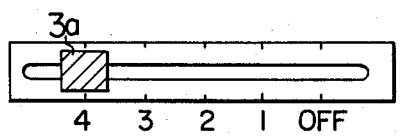
FIG. 2 shows the construction of the actuating part of the level switch shown in FIG. 1.

Next, the actuating part of the level switch 3 shown in FIG. 2 will be described. In the Figure, numeral 3a designates a sliding terminal operable by an operator for selectively inhibiting the voice warning with respect to the respective ranks. When the sliding terminal 3a is moved to a position OFF, the power supply switch 7 is opened and a command is generated and applied to the circuit 5 to inhibit the voice warning with respect to ranks 1to 4, and when it is moved to a position 1, a command is generated and applied to the circuit 5 to inhibit the voice warning with respect to the ranks 2 to 4. When the sliding terminal 3a is moved to a position 2, a command is generated and applied to the circuit 5 to inhibit the voice warning with respect to the ranks 3 and 4, and a command to inhibit the voice warning with respect to the rank 4 is generated and applied to the circuit 5 when the sliding terminal 3a is moved to a position 3. When the sliding terminal 3a is moved to a position 4, a command is generated and applied to the circuit 5 to permit the voice warning with respect to all the ranks. It is to be noted that the power supply switch 7 is closed whent the sliding terminal 3a is moved to the positions 1, 2, 3 and 4.

The detailed classification of the items to be detected in accordance with the above-mentioned ranks is as follows.

The rank 0 . . . malfunctions, etc., in the brake system, the engine section and the lamps.

The rank 1 . . . low remaining fuel level, low engine oil level, tire pressure drop below normal, etc.

The rank 2 . . . lights left on forgetfully, fastening of seat belts, etc.

The rank 3 . . . low washing liquid level, open doors, etc.

The rank 4 . . . condition of various controlling switches, etc.

It should be noted here that the voice warning is forcibly provided with respect to the rank 0 items irrespective of the position of the sliding terminal 3a. As a result, the smaller the indicator number of the rank is, the higher the priority of the rank becomes.

With the construction described above, the operation of the embodiment will now be described with reference to the computing flow charts shown in FIGS. 3 and 4. The computing flow chart of FIG. 3 shows the computational operations of a subroutine which is executed within the computing circuit 5 each time a predetermined time elapses, and the flow chart of FIG. 4 shows the interruption process performed in response to the interruption signal from the encoder 2.

Figure 3:
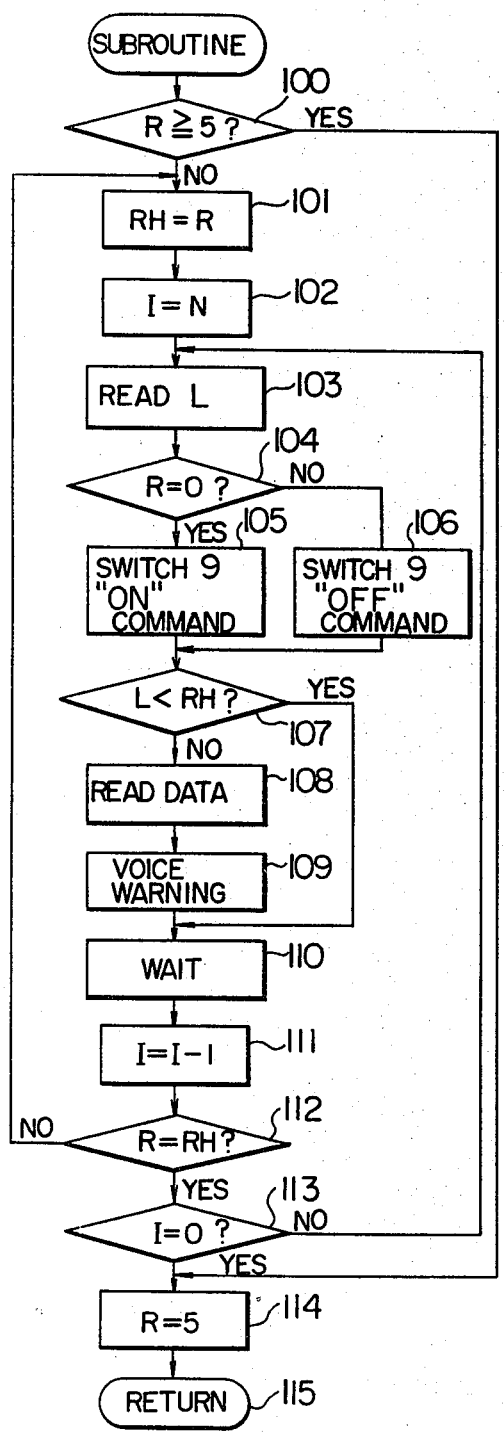
FIG. 3 is a computing flow chart showing the computational operations of a subroutine for the computing circuit shown in FIG. 1.
Figure 4:
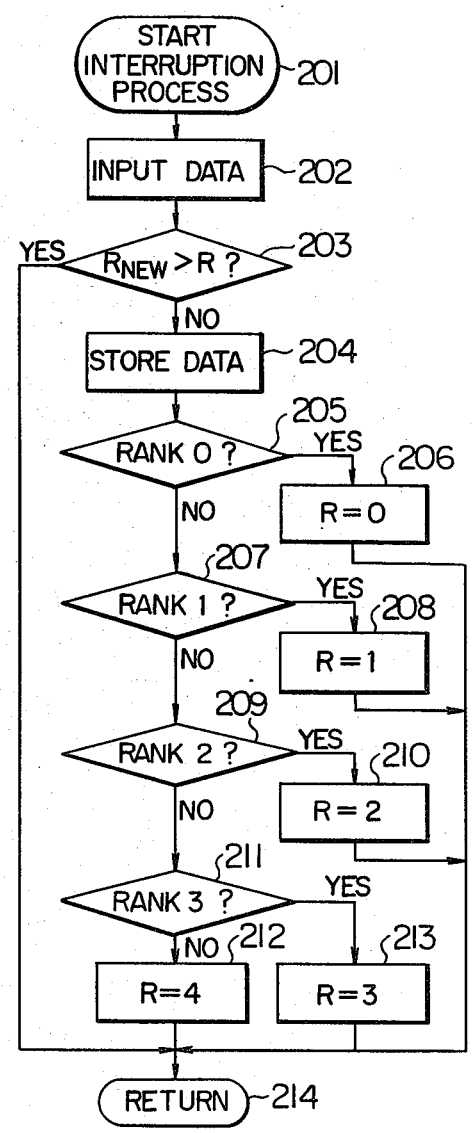
FIG. 4 is a flow chart showing the interrupt process performed in response to the interruption signal from the encoder shown in FIG. 1.

When an automobile equipped with the units 1 to 8 of FIG. 1 comes into operation, the computing circuit 5 executes the subroutine of FIG. 3 at predetermined intervals. More specifically, the computational operations are performed so that the decision of a step 100 results in "YES" and the control is transferred to a step 114 setting a rank data R to 5.

Thereafter, when any one of the sensors in the sensor group 1 detects a specified condition and generates a specified condition detection signal, the encoder 2 generates a location signal corresponding to the generation of the specified condition detection signal and an interruption signal. In response to the generation of the interruption signal, the computing circuit 5 interrupts the computational processing that is in progress and the interrupt computational operations shown in FIG. 4 are started by a start step 201. Then, the control is transferred to a step 202 which in turn inputs the code data from the encoder 2 and the control is transferred to a step 203 which in turn determines whether the rank data $R_{NEW}$ corresponding to the inputted code data (one preliminarily assigned to one of the ranks 0 to 4 in correspondence with the code data) is greater than the previously stored rank data R. In this case, if the rank data R has been set to 5 by the step 114 of the subroutine, the decision of the step 203 results in "NO (N)" and the control is transferred to a step 204 which in turn stores the code data. The following steps 205 to 213 determine the value of the rank data R in accordance with the rank data $R_{NEW}$. The control is then transferred to a return step 214 from which the control is returned to the previously interrupted computational processing.

When one of the values 0 to 4 corresponding to the rank data R has been determined so that the control is returned to the subroutine of FIG. 3, the decision of the step 100 results in "NO" so that the control is transferred to a step 101 and a stored data RH is set to the value of the rank data R and then stored. The control is then transferred to a step 102 so that a desired number of times or frequency of voice warning corresponding to the value of the rank data R is set in a frequency data I or counter means (the higher the priority of the rank is, the greater the frequency of voice warning becomes). Then, the control is transferred to a step 103 so that a command data L corresponding to the position of the sliding terminal 3a is read from the level switch 3. Then, the control is transferred to a step 104 which in turn determines whether the rank data R is 0 or the highest priority rank. If it is the rank 0, the control is transferred to a step 105 so that the switch 9 is forcibly closed and an "ON" command is generated to operate the speaker 6 irrespective of the ON-OFF condition of the switch 7. If it is not the rank 0, the control is transferred to a step 106 and an "OFF" command is generated to open the switch 9. Then, the control is transferred to a step 107 so that the stored rank data RH and the command data L are compared. If it is determined that the command data L is greater than the stored rank data RH, that is, the rank corresponding to the detected specified condition is higher (in priority) than the selected rank, the decision of the step 107 now results in "NO" and the control is transferred to a step 108, thus reading the location of specified condition indicative data corresponding to the frequency data I and the stored data RH or the data stored by the step 204. Then, the control is transferred to a step 109 so that the voice data corresponding to the data read is successively read from the voice data ROM 4 and the corresponding voice signal is then applied to the speaker 6.

Then, the control is transferred to a step 110 so that after the expiration of a predetermined wait period for the next voice warning, the control is transferred to a step 111 and the frequency data I is decreased by 1. The control is then transferred to a step 112 which determines whether the rank data R is equal to the stored data RH. If the rank data R has not been changed by the interruption routine, the rank data R is equal to the stored data RH and thus the decision of the step 112 results in "YES". Thus, the control is transferred to a step 113 which in turn determines whether the frequency data I of the counter means is zero. If the frequency data I has any value, the decision of the step 113 results in "NO" and the control is returned to the step 103. Thereafter, the computing operations of the steps including from the step 103 to the step 113 are performed repeatedly and the speaker 6 generates a warning voice corresponding to the detected specified condition each time the predetermined time expires. When the frequency data I is reduced to zero, the decision of the step 113 results in "YES" so that the control is transferred to the step 114 and the rank data R is set to 5, thus transferring the control to a step 115.

With the above-described generation of warning voice, if the sliding terminal 3a is moved to the position OFF when the rank of the detected specified condition is other than zero, the power supply switch 7 is opened and the generation of the warning voice is stopped. On the contrary, if the rank of the detected specified condition is zero, the switch 9 stays closed and thus the warning voice is forcibly generated.

On the other hand, when the control is transferred to the step 107 of the subroutine in FIG. 3 so that the step 107 determines that the stored data RH is greater than the command data L, that is, when it is determined that the rank of the detected specified condition is lower in priority than the selected rank, the decision of the step 107 results in "YES" and the control is transferred to the step 110. Thus, no voice warning is given.

If, prior to the transfer of the control to the step 112 of the subroutine, another specified condition is detected so that the rank data R is changed by the interruption routine, the decision of the step 112 results in "NO" so that the control is returned to the step 101 and the computational operations on the rank data R are performed again.

While, in the embodiment described above, the command means comprises the level switch 3 for selecting any one of the ranks 1 to 4, it is possible to use a selector switch which inhibits the voice warning with respect to only particular one of the ranks or a switch which allows the voice warning with respect to any particular one of the ranks and inhibits the voice warning with respect to the remainder.

Further, while, the control means comprises the computing circuit 5 for performing the computational operations to inhibit the voice warning in accordance with the rank determination, it is possible to design so that in response to the command from the command means the reception of the specified condition detection signals from the sensors for the inhibited items is prevented. In this case, the invention is not intended to be limited to the computational operations by means of software and it is possible to perform the operations by means of hard logic using electronic circuitry.

It will thus be seen from the foregoing description that in accordance with the present invention, a voice warning system for vehicles including a plurality of sensors each adapted to detect the condition of one of a plurality of items to be detected and means responsive to the detection of a specified condition by any one of the sensors to give a voice warning of the specified condition, further comprises command means responsive to an external operation to generate a command to inhibit the voice warning in response to the detection of a specified condition by any one of the sensors associated with particular ones of the items, and control means for inhibiting the generation of the voice corresponding to the specified condition detected by any one of the sensors for the items inhibited by the command from the command means, and thus the system of this invention has a great advantage that the voice warning with respect to the items to be detected can be selectively inhibited in response to the external operation by the vehicle occupant.

We claim:

1. A voice warning system for vehicles comprising:
   a plurality of sensors each of which detects a specified condition of one of a plurality of items of a vehicle which are to be detected and generates a detection signal;
   encoder means responsive to said detection signal to generate a code signal indicative of corresponding one of said items and an interruption operation command signal;
   voice generating means including means storing warning voice data corresponding to each of said items to be detected to generate a warning voice;
   externally-operated command means for establishing a plurality of ranks of different priorities to classify said items correspondingly and selecting one of said ranks to inhibit said voice generating means from generating warning voices corresponding to particular one or more of said ranks; and
   computing means responsive to said encoder means and said externally-operated means to control said voice generating means to inhibit the generation of warning voices corresponding to one or more of said ranks lower in priority than said selected rank, said computing means including first memory means responsive to said interruption operation command signal and said code signal to store said code signal, means for determining one of said ranks corresponding to said code signal, second memory means for storing said determined rank, comparing means for comparing said stored rank with said rank selected by said externally-operated command means to cause said voice generating means to generate a warning voice when said stored rank is not lower in priority than said selected rank, and counter means whereby after the generation of said warning voice a code signal corresponding to another higher-priority one of said ranks is read from said first memory means to cause the generation of another warning voice.

2. A system according to claim 1, wherein said externally-operated command means comprises rank selecting switch means for establishing a plurality of ranks of different priorities to classify said items to be detected correspondingly to inhibit the generation of warning voices corresponding to a selected one of said ranks and lower-priority one or ones of said ranks.

3. A system according to claim 1 or 2, further comprising means responsive to said encoder means to cause the generation of a warning voice corresponding to a specified condition detected by each said sensor irrespective of a command from said externally-operated command means.

4. A voice warning system for vehicles comprising:
   a plurality of sensors each of which detects a specified condition of one of a plurality of items of a vehicle which are to be detected;
   voice generating means for giving a voice warning of said specified condition detected by each said sensor;
   command means externally operable to generate a command to selectively inhibit said voice warning of sensor detected specified conditions with respect to said items; and
   control means responsive to said command from said command means for controlling said voice generating means so as to inhibit said voice warnings corresponding to said command;
   said externally-operated command means comprising rank selecting switch means for establishing a plurality of ranks of different priorities to classify said items to be detected correspondingly to inhibit the generation of warning voices corresponding to a selected one of said ranks and lower-priority one or ones of said ranks.

* * * * *